(No Model.)

T. C. SEEKEL.
MACHINE FOR SAWING BARREL HOOPS.

No. 605,349. Patented June 7, 1898.

Witnesses
H. A. Whitney
F. W. McCabe

Inventor
Theodore C. Seekel
By his Attorney, George B. Willcox

UNITED STATES PATENT OFFICE.

THEODORE C. SEEKEL, OF BAY CITY, MICHIGAN.

MACHINE FOR SAWING BARREL-HOOPS.

SPECIFICATION forming part of Letters Patent No. 605,349, dated June 7, 1898.

Application filed September 3, 1897. Serial No. 650,444. (No model.)

*To all whom it may concern:*

Be it known that I, THEODORE C. SEEKEL, a citizen of the United States, residing at Bay City, in the county of Bay and State of Michigan, have invented a new and useful Improvement in Machines for Sawing Barrel-Hoops, of which the following is a specification, reference being had therein to the accompanying drawings.

My invention relates to improvements in machines for sawing barrel-hoops from poles, and more particularly to that class of hoop-sawing machines in which a band-saw is used in connection with adjustable and flexible guides for the poles, the office of the guides being to adjust the pole in relation to the saw so as to produce a hoop of uniform thickness regardless of bends or unevenness in the pole.

The objects of my invention are, first, to produce a hoop-sawing machine having few working parts that will produce hoops of uniform thickness from crooked or uneven poles; second, to automatically feed the pole through the machine at a uniform speed; and third, to provide a guiding device for the pole that will keep the pole in proper relation to the saw, although the pole may be crooked or uneven.

The invention consists in the combination and arrangement of parts, together with the operation of the same, as I shall hereinafter fully describe and explain and which will also be specifically set forth in the claims of this specification.

My invention will be found illustrated in the accompanying drawings, in the several views of which the same figures of reference are used to designate the same parts and devices.

Figure 1:
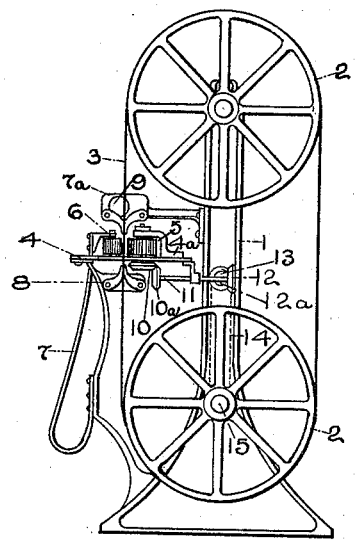
Figure 2:
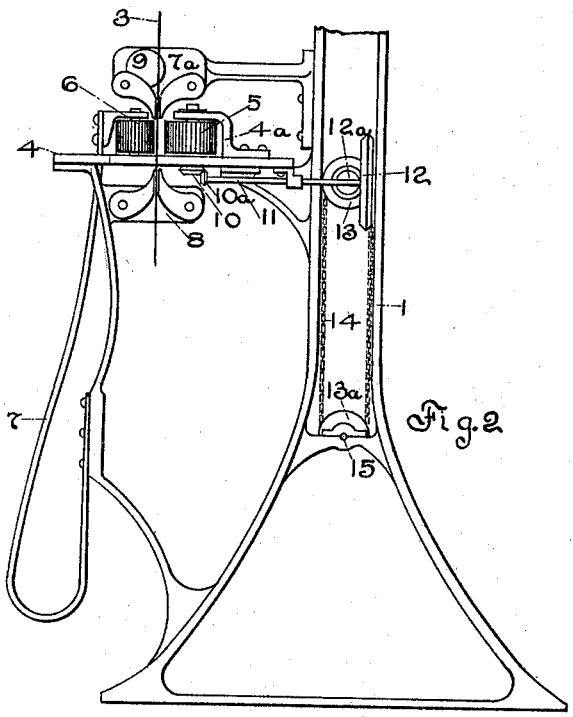

Figure 1 in the drawings is a front elevation of the entire machine, showing a band-saw with pole guiding and feeding device attached. Fig. 2 is an enlarged front elevation of the guiding and feeding apparatus with adjacent parts of the band-saw and frame.

1 is a band-saw frame carrying band-wheels 2, on which the saw 3 runs.

4 is a frame or bracket rigidly attached to the saw-frame to support the pole guiding and feeding mechanism and to serve as a table over which the pole is drawn.

5 is a cylindrical feed-roller so mounted on the frame 4 (by a bracket $4^a$, having slotted bolt-holes in its base) as to be horizontally adjustable relatively to the saw, its axis being parallel with the saw-blade. 6 is a roller similar to 5, but so mounted on a flexible spring 7 as to constantly press toward the saw-blade 3. These rollers 5 and 6 and their operation are essential features of my invention and will be described more fully hereinafter.

$7^a$ and 8 are guides having vertical slots or grooves to receive the back of the saw-blade and keep the saw in line while cutting. A circular friction-disk 9 is preferably provided in the guide $7^a$, with its axis horizontal and adapted to rotate when brought into contact with the moving saw by the thrust of the pole.

The cylindrical feeding-roller 5 above mentioned is preferably made of some flexible material, as rubber or composition, to form a somewhat yielding surface against which the side of the pole may be pressed. The roller 5 is arranged to revolve about its axis by being suitably connected (through gears, chain, or otherwise) to the axle of the band-saw wheel.

In the arrangement shown in the drawings the shaft of roller 5 is provided at its lower end with a bevel-pinion 10. This pinion is driven by a second pinion $10^a$, fixed on a shaft 11. Pinion 12 is fixed to the other end of the shaft 11 and is driven by a bevel-pinion $12^a$ and sprocket 13. The sprocket derives its motion from the band-wheel shaft by a chain 14 and a second sprocket $13^a$, attached to the wheel-shaft 15.

Having designated the various parts comprising my invention, I call attention to the method of operating, as follows: As the saw runs a rotary motion toward the saw is imparted by the axle 15 of the lower wheel to the roller 5 through the chain 14, shaft 11, and the gears above mentioned. If the end of a pole be placed between the revolving roller 5 and the flexibly-mounted idler or whip roll 6, the flexible or yielding surface of the roller 5 will seize the pole and draw it toward the saw, while the flexible whip-roll 6 will hold the pole pressed snugly against the feed-roller 5. These rollers 5 and 6 are preferably placed with the center line at right angles to the direction of travel of the pole and slightly in front of the cutting edge of the saw. It is evident that adjusting the roller 5 at a distance from the saw-blade corresponding to the desired thickness of the hoop will insure the production of a hoop of uniform thickness, provided the pole is kept in contact with the feed-roller 5. This contact is secured by means of the flexibly-mounted whip-roll 6, which continually presses against the side of the pole as it passes to the saw, keeps the pole in contact with the feed-roller, and consequently in proper relation to the saw.

In order to admit of variation in the diameters of poles to be sawed, the whip-roll 6 is mounted, as shown in the drawings, on a spindle attached by a bracket or other suitable means to the end of a long flat spring 7, the upper end of spring 7 being retained by a lateral horizontal slit in the top of bracket 4, admitting of movement of the roller to and from the saw-blade.

Although the whip-roller 6 is shown mounted on a flat spring, the spirit of my invention would be preserved if the roller 6 were flexibly pressed toward the saw by means of pulleys and weights or by a coiled spring, the particular manner of mounting the roller being immaterial, it being essential only that the roller 6 be adapted to press against the side of the pole and yield to variations in thickness and unevenness of the pole.

I am aware that machines for sawing halfround barrel-hoops have been made in which a band-saw is used in connection with guides for the saw and a roller for regulating the thickness of the hoop, and I do not claim this, broadly, as my invention; but I am not aware that a machine as herein described, having a yielding or flexible roller adapted not only to regulate the thickness of the hoop, but also to feed the pole to the saw by frictional contact between the pole and the yielding periphery of the roller, together with a flexibly-mounted whip-roller for retaining the pole in contact with the feed-roller and adapted to override obstructions on the pole, has ever before been used, and it is this combination of parts that I desire to secure by Letters Patent.

I am aware that machines for planing or dressing the surface of hoops which have been previously split from poles have been used in which the hoop is fed to the planer-knives by rollers placed either in front of or beyond the cutters, or both, rotated from the main shaft of the machine and pressed toward the knives by a yieldingly-mounted presser-roll. I am also aware that it is old in hoop-sawing machines to employ a band-saw running between a spring-pressed roller on one side and a yielding-surfaced guide-roller loosely mounted as an idler on the other side of the saw. Therefore I do not desire to claim these devices broadly; but I am not aware that a machine for sawing hoops from poles has ever before been produced in which the herein-described system of employing a feeding-roller driven from the band-wheel shaft, serving also as a guide for the hoop, and the spring-pressed whip-roll have been used for the purpose described.

In actual practice with band sawing-machines that are not provided with means for feeding the pole to the saw at a uniform rate certain disadvantages are evident that operate to prevent the production of hoops of even thickness throughout. In a machine of this kind having no means for automatically feeding the pole it is necessary for the operator not only to guide the pole, but also to feed it forward by pushing it between the rollers and against the saw. To do this he must change his grasp on the pole several times during its passage through the saw. Almost invariably in so doing the pole is slightly rotated about its axis, producing a warped surface and consequently a hoop of uneven thickness. Moreover, it is practically impossible for the operator to produce a uniform hoop when, as with the machines mentioned, his attention must be divided between guiding the pole through the saw and pushing it forward at approximately uniform speed. That it is very essential to the production of a perfect hoop that the pole be fed to the saw at a uniform speed is evident from the fact that a hoop sawed by a hand feeding-machine of this type will not bend in a true circle, but will bend in the form of an irregular polygon having flattened parts and corners, each corner corresponding to a change of grasp by the operator when the hoop was sawed. Furthermore, two persons are required for the practical operation of a hand-fed machine, one to push the pole forward and to guide it and another to draw the pole through the saw after the greater part of the hoop is sawed and it becomes unmanageable for the first operator by overbalancing the short unsawed end.

The machine herein described overcomes the inherent defects in former machines. By employing a single yielding-surfaced feeding-roller for regulating the thickness of the hoop and also positively rotating it toward the saw it feeds the pole at a uniform rate directly proportional to the speed of the saw and insures that all parts of the hoop will be sawed true and even, hard places, such as knots, being sawed at the same speed as the softer parts of the hoop, which is practically impossible in a hand-fed machine and is of great importance in the production of perfect hoops. In employing the flexible-gage-roller as a feeding-roller also numerous advantages of practical importance are derived. The operator not being obliged to divide his attention between pushing the pole to the saw and guiding it, as in other machines, has only to attend to varying the direction of the pole to accommodate its crooks and bends, and consequently produces a better hoop. The feeding-roller also serves as a fulcrum about which the pole is swerved in guiding it, and as the roller is practically on a line transverse with the cutting edge of the saw the thickness of the hoop is not affected thereby, as would be the case if the feeding-roller were either in front of or behind the saw, as in the hoop-planing machines above mentioned.

With my device for automatically feeding the hoop, as above described, one operator is sufficient for each machine.

What I claim as my invention is—

1. In a machine for sawing barrel-hoops from poles, the combination with a band-saw having a horizontal sawing-table and a yielding whip-roller; of a yielding-surfaced guide-roller opposite the whip-roller, with its axis parallel with and at the side of the saw-teeth, said guide-roller being adapted to be rotated toward the saw by connection with the band-wheel shaft, and serving both as a fulcrum about which the hoop may be swerved in sawing and also as a friction feeding-roller, substantially as described and for the purpose set forth.

2. In a machine for sawing barrel-hoops from poles, having a band-saw and a flexibly-mounted whip-roller; the combination feeding and guiding mechanism herein described, consisting of a vertical guide-roller at the side of the saw and substantially on the same transverse line with the saw-teeth and the axis of the whip-roller, forming a fulcrum about which to swerve the pole being sawed, and having a yielding surface adapted to seize the pole, said roller being rotated from the band-saw shaft and by the friction of its yielding surface feeding the pole at a speed proportional to the velocity of the saw, substantially as described.

3. In a hoop-sawing machine, a combined feeding and guiding roller having a yielding surface for feeding the pole by frictional contact therewith, together with means of rotating said roller at a speed proportional to the speed of the saw, the roller being mounted substantially on a line with the teeth of the saw, and forming a fulcrum about which to swerve the pole in feeding, substantially as described.

In testimony whereof I sign this specification in the presence of two witnesses.

THEODORE C. SEEKEL.

Witnesses:
G. B. WILLCOX,
HERBERT A. WHITNEY.